(12) United States Patent
Takahashi et al.

(10) Patent No.: US 6,896,566 B2
(45) Date of Patent: May 24, 2005

(54) PERSONAL WATERCRAFT

(75) Inventors: Keiji Takahashi, Akashi (JP); Toshio Araki, Kakogawa (JP)

(73) Assignee: Kawasaki Jukogyo Kabushiki Kaisha, Kobe (JP)

( * ) Notice: Subject to any disclaimer, the term of this patent is extended or adjusted under 35 U.S.C. 154(b) by 0 days.

(21) Appl. No.: 10/316,969

(22) Filed: Dec. 10, 2002

(65) Prior Publication Data

US 2003/0119387 A1 Jun. 26, 2003

(30) Foreign Application Priority Data

Dec. 21, 2001 (JP) ........................................ 2001-388960

(51) Int. Cl.$^7$ ........................ B63H 21/38; F02M 35/10
(52) U.S. Cl. ................................ 440/88 A; 123/184.49
(58) Field of Search ............................ 440/88 R, 88 A; 123/184.24, 184.25, 184.26, 184.42, 184.43, 184.44, 184.47, 184.48, 184.49

(56) References Cited

U.S. PATENT DOCUMENTS

| | | | | |
|---|---|---|---|---|
| 4,098,079 A | * | 7/1978 | Ueda ........................... | 60/290 |
| 4,441,468 A | * | 4/1984 | Yoneda et al. .......... | 123/198 E |
| 4,727,829 A | * | 3/1988 | Kondo et al. .......... | 123/184.49 |
| 4,765,285 A | * | 8/1988 | Kobayashi ............. | 123/184.49 |
| 5,040,495 A | * | 8/1991 | Harada et al. ......... | 123/184.57 |
| 5,088,454 A | * | 2/1992 | Washizu et al. ....... | 123/184.49 |
| 5,647,314 A | * | 7/1997 | Matsumura et al. ... | 123/184.57 |
| 5,960,770 A | * | 10/1999 | Taue et al. ................... | 123/317 |
| 6,167,699 B1 | * | 1/2001 | Johnston et al. .............. | 60/304 |
| 6,253,696 B1 | * | 7/2001 | Mashiko .................... | 114/55.5 |
| 6,302,752 B1 | * | 10/2001 | Ito et al. ................... | 440/88 R |
| 6,454,622 B2 | * | 9/2002 | Mashiko et al. .......... | 440/88 R |
| 6,475,046 B2 | * | 11/2002 | Muramatsu et al. ...... | 440/88 R |
| 6,612,885 B2 | * | 9/2003 | Yamazaki et al. ........ | 440/89 C |

* cited by examiner

*Primary Examiner*—Andrew D. Wright
(74) *Attorney, Agent, or Firm*—Alleman Hall McCoy Russell & Tuttle LLP (57) ABSTRACT

A watercraft comprises two air-intake boxes 5, 8 mounted in air-intake pipes 6, 9 of the engine 1. The air-intake box 5 is provided on one side of the engine 1 and located lower than a waterline of the watercraft and the air-intake box 8 is provided on the other side of the engine 1 and located higher than the waterline. End portions of the air-intake pipes 6, 9, which are located downstream in air flow in the air-intake boxes 5, 8, are connected to upper portions of the air-intake boxes, respectively. The air-intake pipe 6 is provided with a throttle valve 7. An air-suction valve 12 is adapted to suction air from upstream of the throttle valve 7 and deliver it to the vicinity of an exit of an exhaust port. The air suction valve 12 is provided with a noise absorbing member.

12 Claims, 6 Drawing Sheets

PERSONAL WATERCRAFT

BACKGROUND OF THE INVENTION

1. Field of the Invention

The present invention relates to a jet-propulsion personal watercraft (PWC) which ejects water pressurized and accelerated by a water jet pump rearward and planes on a water surface as the resulting reaction. More particularly, the present invention relates to an air-intake structure of an engine for driving the water jet pump mounted in a body of the personal watercraft.

2. Description of the Related Art

In recent years, so-called jet-propulsion personal watercraft have been widely used in leisure, sport, rescue activities, and the like. The personal watercraft is configured to have a water jet pump that pressurizes and accelerates water sucked from a water intake generally provided on a hull bottom surface and ejects it rearward from an outlet port. Thereby, the personal watercraft is propelled.

In the personal watercraft, the engine is contained in a FRP (Fiber Reinforced Plastic) body constituted by a deck and a hull. Many of the personal watercraft are straddle-type personal watercraft and stand-up type personal watercraft. In these personal watercraft, an engine room in the body that contains the engine has a limited space. Among these personal watercraft, in the straddle-type personal watercraft having the engine room below the seat, the size of the engine room is inevitably limited by the size of the seat straddled by a rider. Under the circumstances, in the personal watercraft, it is necessary to efficiently place the engine in such a limited space in the deck, together with associated components in the air-intake system, an exhaust system, and the like.

Noises generated in an air-intake pipe of the engine, i.e., noises resulting from oscillation of the intake air in the air-intake pipe, are uncomfortable to the rider. Also, it is essential that water ingress from an air-intake passage into an inside of the engine be avoided.

SUMMARY OF THE INVENTION

The present invention addresses the above-described conditions, and an object of the present invention is to provide a personal watercraft having an engine capable of being efficiently placed in a narrow engine room of a body of the watercraft, effectively reducing noises generated by air-intake of the engine, and effectively subduing water ingress from an air-intake passage into an inside of the engine.

According to the present invention, there is provided a personal watercraft having a water jet pump to propel the watercraft, comprising: an engine for driving the water jet pump; an air-intake pipe for suctioning air into a cylinder of the engine; and at least two air-intake boxes mounted in series to the air-intake pipe.

In the above-mentioned engine, the plurality of air-intake boxes serve as a plurality of silencers in air-intake passages. Thereby, a silencing effect in air-intake is improved. Also, the plurality of air-intake boxes respectively subdue the water ingress from the air-intake passages into an inside of the engine. Further, the engine can be installed in the limited space of the engine room relatively easily.

Preferably, at least one of the air-intake boxes may be placed at one side of the engine, and at least one of the air-intake boxes may be placed at the other side of the engine. This is because these air-intake boxes are efficiently placed in the limited space of the engine.

Preferably, the at least two air-intake boxes may be located at different positions in a vertical direction. Thereby, the water ingress into the engine is effectively subdued.

Preferably, the at least one of the air-intake boxes may be located higher than a waterline of the watercraft which is at rest on water, and the other air-intake box may be located closer to a bottom of the watercraft inverted on water than a waterline of the inverted watercraft is. Thereby, the water ingress into the air-intake system is subdued when the water enters an inside of the engine room from outside while the watercraft is at rest on water, or inverted.

Preferably, an end portion of the air-intake pipe which is located downstream in air flow in the air-intake box may be connected to an upper portion of the air-intake box. This is because the water entering an inside of the air-intake box is prevented from flowing into the air-intake pipe located downstream of the air-intake box.

Preferably, the air-intake pipe may be provided with a throttle valve for adjusting an air-intake amount of the engine, and the watercraft may further comprise a secondary air supplying device adapted to suction air from an air-intake passage located upstream of the throttle valve and deliver the air into an exhaust port of the engine, the air-intake passage including the air-intake pipe and the air-intake boxes. This is because the amount of secondary air delivered to the vicinity of the exit of the exhaust port is hardly changed by an operation of the throttle valve.

Preferably, the secondary air supplying device may be placed at a position as high as or lower than an upper end of the air-intake box placed at the highest position. This makes it possible for the secondary air supplying device to be efficiently placed in the limited space of the engine room.

Preferably, the secondary air supplying device may have a detecting portion for detecting an internal pressure of the air-intake passage downstream of the throttle valve, and may be adapted to adjust the amount of secondary air delivered to the vicinity of the exit of the exhaust port according to the pressure detected by the detecting portion. Thereby, the amount of the secondary air to be supplied by the secondary air supplying device becomes smaller as the opening degree of the throttle valve decreases. Thus, the required amount of secondary air is properly supplied.

Preferably, the secondary air supplying device may contain a noise absorbing member provided with an air passage through which suctioned air flows. Thereby, noises generated in the second air supplying system are reduced.

Preferably, at least a face of the noise absorbing member which is in contact with secondary air may be covered by a water-proof material. Thereby, it is possible to subdue reduction of a noise absorbing effect which would be caused by absorption of water contained in the secondary air by the noise absorbing member.

The above and further objects and features of the invention will be more fully apparent from the following detailed description with accompanying drawings.

DETAILED DESCRIPTION OF THE PREFERRED EMBODIMENTS

Hereinafter, a personal watercraft according to an embodiment of the present invention will be described with reference to the accompanying drawings.

Figure 1:
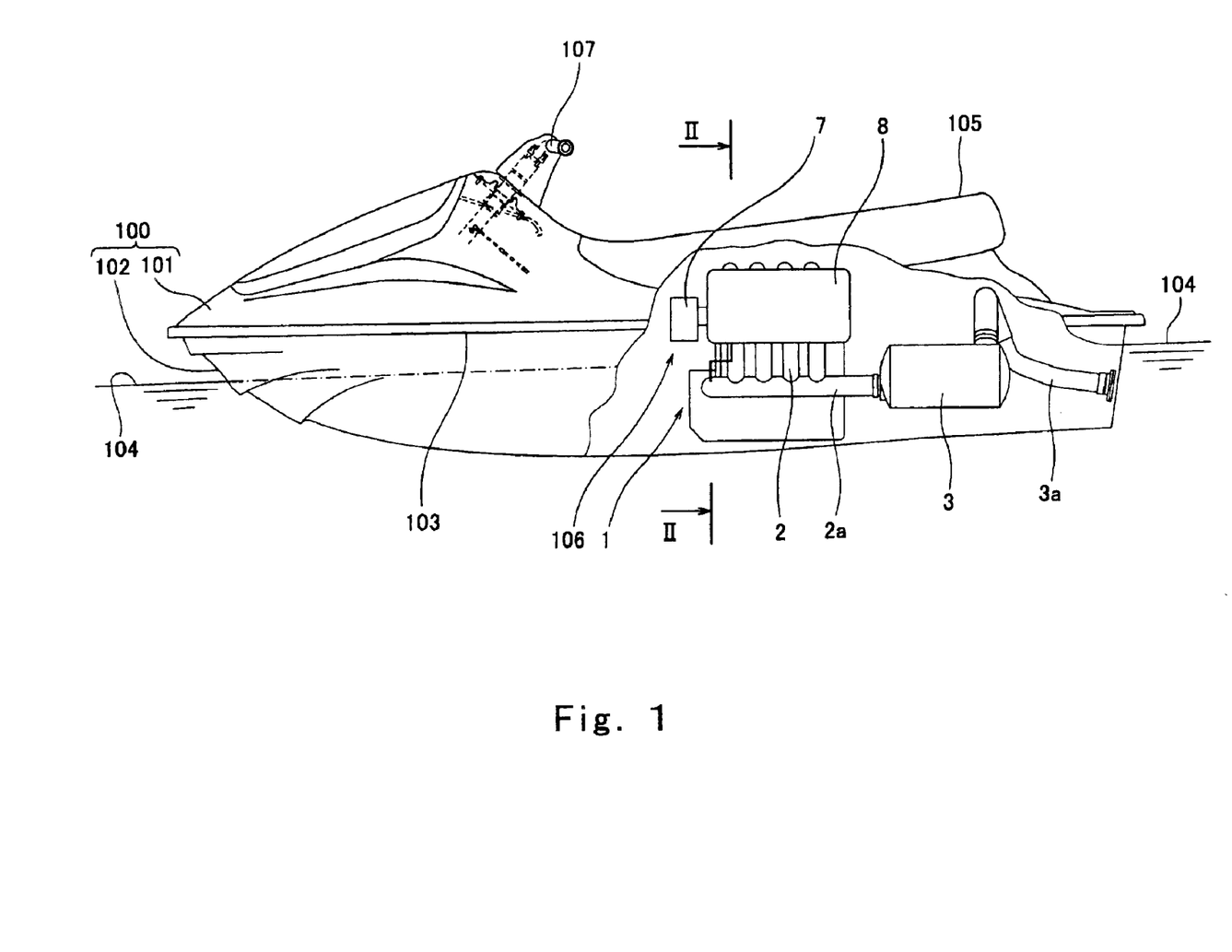
FIG. 1 is a partially cutaway side view of a personal watercraft of the present invention, showing an engine and its vicinity.

Referring now to FIG. 1, a straddle-type personal watercraft is shown. In the Figure, reference numeral 100 denotes a body of the watercraft. The body 100 comprises a hull 102 and a deck 101 covering the hull 102 from above. A line at which the hull 102 and the deck 101 are connected over the entire perimeter thereof is called a gunnel line 103. In this embodiment, the gunnel line 103 is located higher than a waterline 104 of the personal watercraft.

A straddle-type seat 105 is mounted onto an upper surface of the body 100 so as to extend substantially from a center portion to a rear portion of the deck 101 in the longitudinal direction of the watercraft. An engine 1 is disposed in a space (engine room) 106 surrounded by the hull 102 and the deck 101 below the seat 105.

Figure 4:
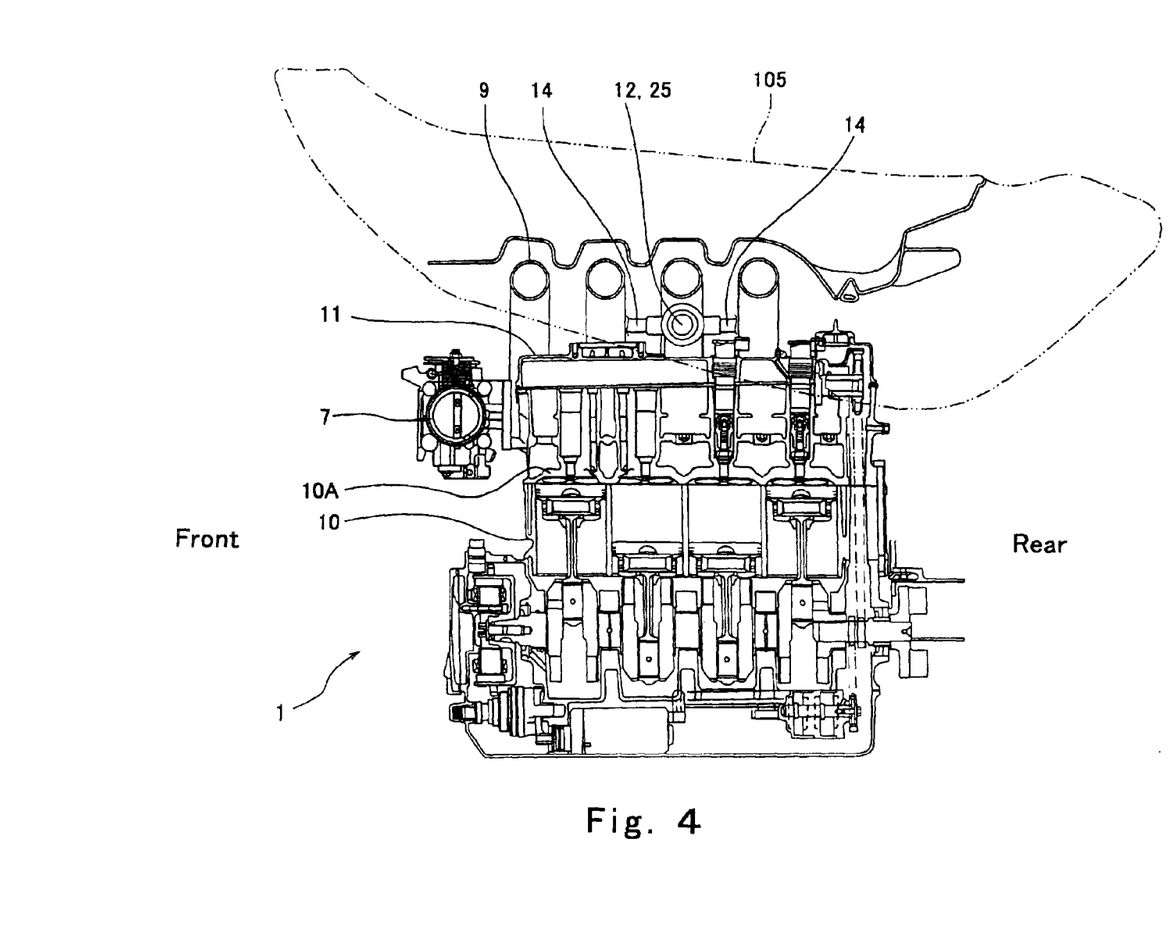
FIG. 4 is a longitudinal sectional view of the engine in FIG. 2.

The engine 1 has multiple cylinders (for example, four cylinders). As shown in FIG. 1, the engine 1 is placed such that the cylinders are arranged along the longitudinal direction of the watercraft (see FIG. 4). Exhaust gases from the engine 1 are sent from exhaust manifolds 2 connected to a side portion of the engine 1 to a water muffler 3 through a collecting pipe 2a. In the water muffler 3, the exhaust gases are muffled and discharged from a transom board outside the watercraft through an exhaust pipe 3a.

A propeller shaft (not shown) connected to an output end of the engine 1 causes an impeller of the water jet pump to rotate. Thereby, the water sucked from a water intake formed on a bottom surface of the watercraft is ejected rearward, and as the resulting reaction, the body 100 obtains a propulsion force. In FIG. 1, 107 denotes a bar-type steering handle.

Figure 2:
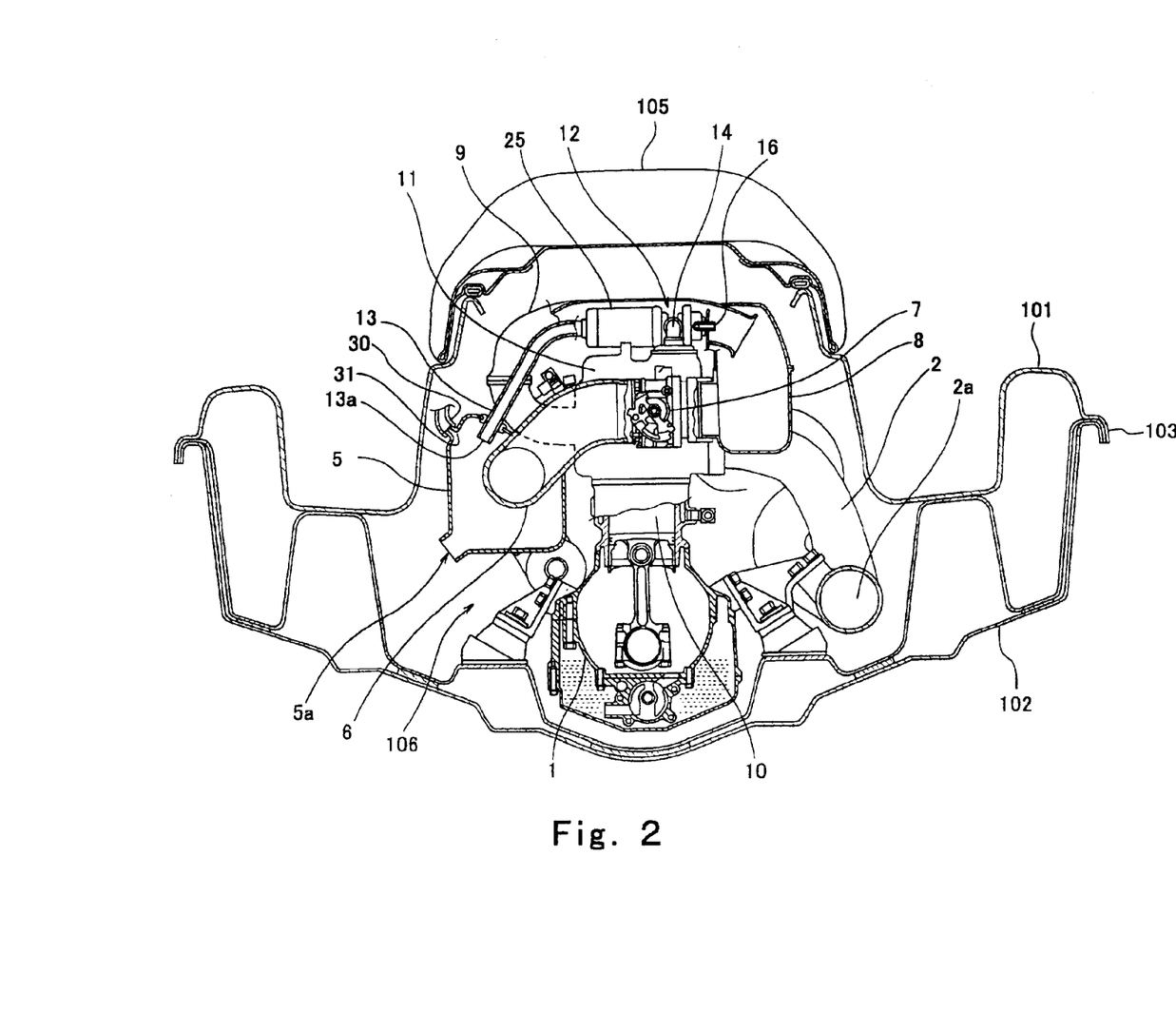
FIG. 2 is a front view of the engine in FIG. 1 and taken along line II—II in FIG. 1.
Figure 3:
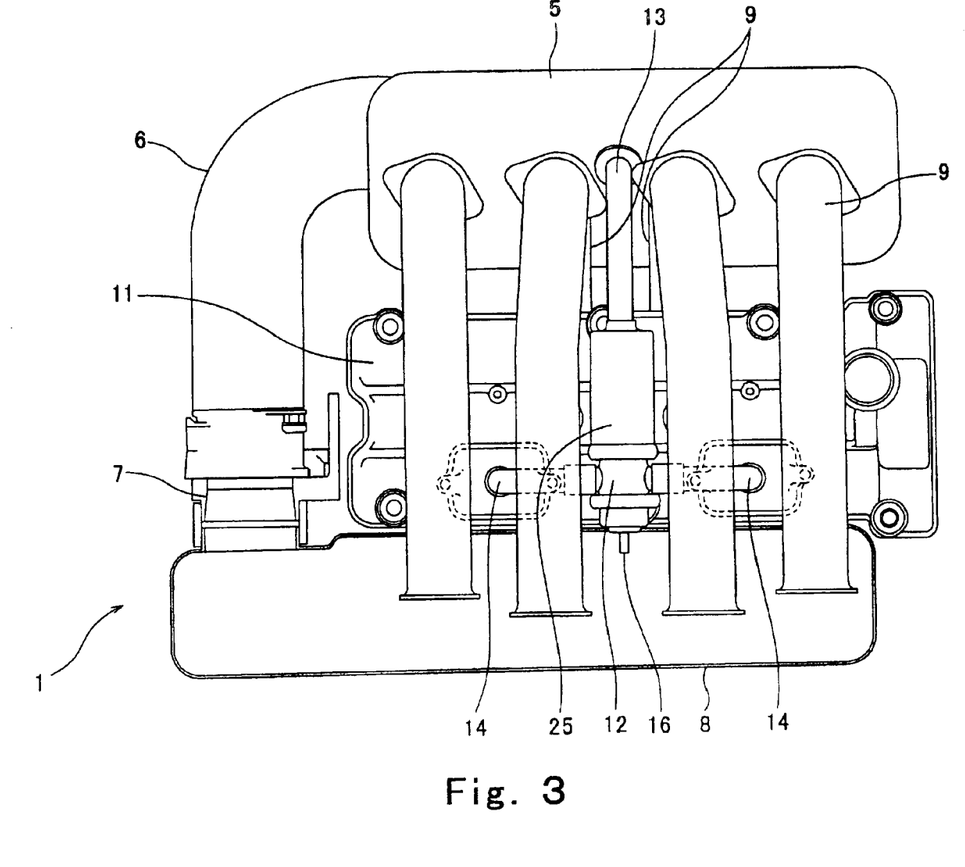
FIG. 3 is a plan view of the engine in FIG. 2.
Figure 5:
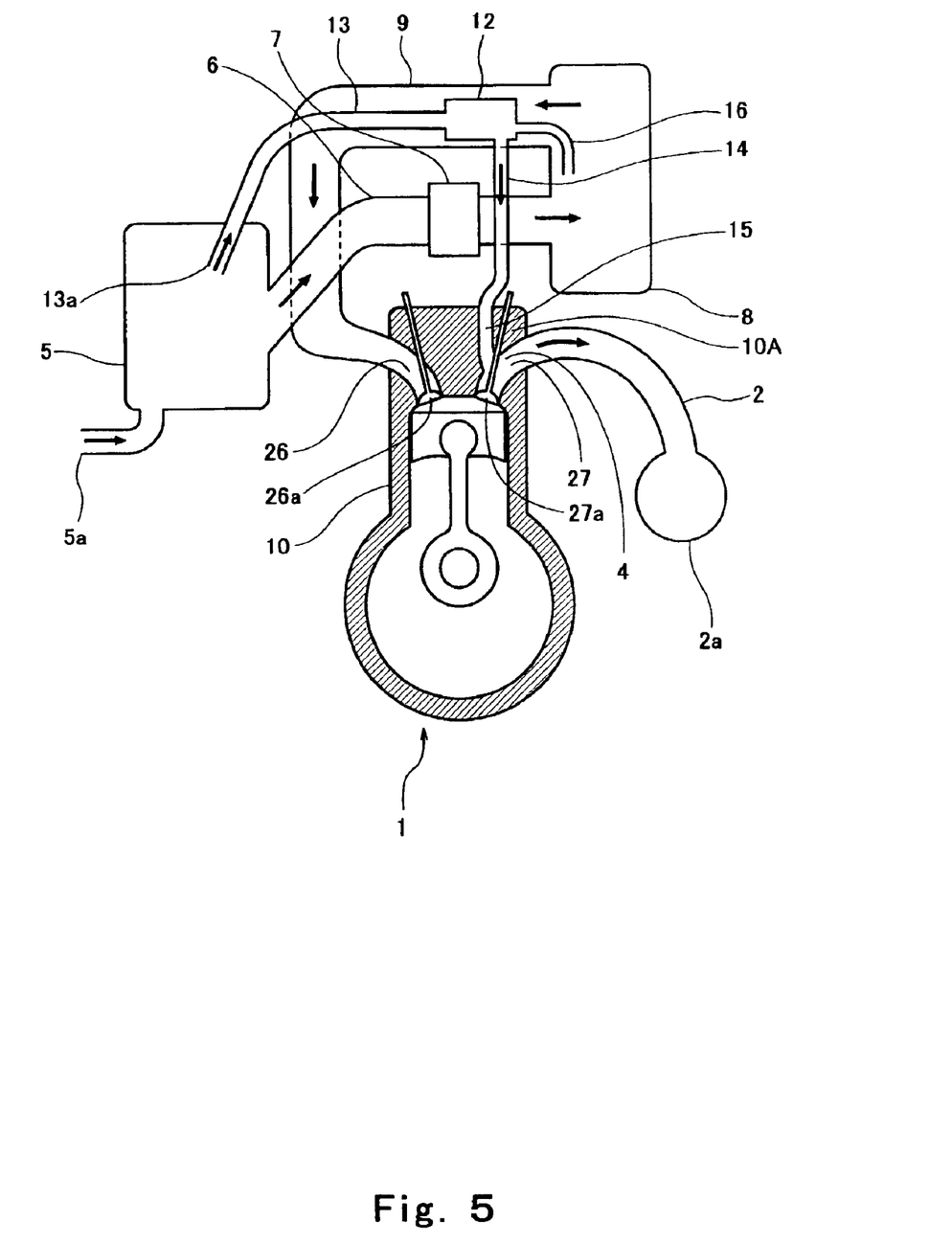
FIG. 5 is a block diagram showing an air-intake path and an exhaust path in the engine in FIG. 2.

The above-mentioned engine 1 is shown in detail in FIGS. 2, 3, 4, and 5. As shown in FIGS. 2 and 3, the engine 1 is provided with a first air-intake box 5 on one side (left side in FIG. 2) as one component in the air-intake system. As defined herein, "one side" (left side) and "the other side" (right side) mentioned later refer to sides of the engine in the direction orthogonal to the longitudinal direction of the engine (watercraft). As clearly shown in these Figures, ambient air is suctioned into the air-intake box 5 through an air-intake hole 5a and delivered to a throttle valve (or throttle body) 7 provided on the front side of the engine 1 (as shown in FIGS. 1 and 3) through a first air-intake pipe 6. The throttle body 7 adjusts the amount of the air suctioned into the engine 1. The resulting air flows into a second air-intake box 8 provided on the other side (right side in FIG. 2) of the engine 1. The air from the second air-intake box 8 branches and flows through four second air-intake pipes 9 so as to be delivered into air-intake ports 26 of the respective cylinders 10. The second air-intake pipes 9 are respectively curved to extend from the second air-intake box 8 above a head cover 11 provided on the upmost portion of the engine and then curved downwardly. The air-intake pipes 9 are further curved to return toward the second air-intake box 8 and connected to the respective cylinders 10. In other words, the second air-intake pipes 9 traverse over the head cover 11. In FIG. 5, reference numeral 26a denotes an air-intake valve and reference numeral 27a denotes an exhaust valve.

The first air-intake box 5 and the second air-intake box 8 are each constituted by a single chamber extending along the longitudinal direction of the engine 1. These boxes 5, 8 are each shared among all the cylinders 10. For maximum volumes and efficient arrangement, the air-intake boxes 5, 8 are provided on both sides of the engine 1 over the entire length thereof. The first air-intake pipe 6 and the throttle body 7 have a one-to-one correspondence with the engine 1. This is because, in the watercraft cruising on the water, its power performance is not greatly improved by providing the throttle body for each cylinder. The efficient use of the limited space of the engine room 106 is more important.

The air-intake box functions as a silencer for reducing noises generated in the air-intake passage caused by air-intake, and serves to remove water contained in the air being suctioned through the air-intake passage. The air-intake box is required to have adequate space for the purpose of reducing noises. Therefore, placing the air-intake box in the narrow engine room 106 of the personal watercraft is troublesome. However, by providing the plurality of air-intake boxes in the above-mentioned manner, they are placed in the engine room relatively easily. The use of the plurality of air-intake boxes instead of a single air-intake box produces a higher silencing effect. In other words, the watercraft has a plurality of silencers.

As shown in FIGS. 2 and 5, the first air-intake box 5 and the second air-intake box 8 are arranged at different positions in the vertical direction. Specifically, the second air-intake box 8 is located higher than the first air-intake box 5. More specifically, the second air-intake box 8 is located higher than a waterline 104 of the watercraft being at rest on the water, and the first air-intake box 5 is located closer to the bottom of the inverted watercraft than the waterline of the inverted watercraft is. With such arrangement, the water ingress from the air-intake passages into the inside of the engine is subdued even when the water enters the inside of the engine room 106 from outside while the watercraft is at rest on the water, cruising, or inverted. The portions located higher or lower than the waterline are defined as an end portion of the air-intake pipe 6 on the air-intake box 5 side and an end portion of the air-intake pipe 9 on the air-intake box 8 side.

The portion where the first air-intake pipe 6 is connected to the first air-intake box 5 is located in an upper portion of the first air-intake box 5, i.e., higher than the bottom of the first air-intake box 5. The portion where the second air-intake pipe 9 is connected to the second air-intake box 8 is located in an upper portion of the second air-intake box 8, i.e., higher than the bottom of the second air-intake box 8. In this embodiment, the portion where the second air-intake pipe 9 is connected to the second air-intake box 8 is located close to an upper end of the second air-intake box 8. This prevents the water flowing into the air-intake boxes 5, 8 from further flowing into the air-intake pipes located downstream.

As mentioned above, the second air-intake pipe 9 extends from the second air-intake box 8 above the head cover 11. This structure also serves to subdue the flow of the water toward the air-intake port 26 (see FIG. 5). The air-intake hole 5a of the first air-intake box 5 through which ambient air is suctioned is formed in the vicinity of the bottom of the first air-intake box 5.

An end portion of each second air-intake pipe 9 on the second air-intake box 8 side extends a predetermined length into the inside of the second air-intake box 8. As shown in FIG. 3, the lengths of the end portions extending into the inside are varied from one another to avoid mutual interference according to the order of combustion in the corresponding cylinders 10. The mutual interference means that the air-intake in one of the second air-intake pipes 9 impedes sufficient air-intake in its adjacent second air-intake pipes 9.

The exhaust gases are re-combusted (oxidized) to be purified. To this end, an air suction valve (ASV) as a secondary air supplying device for introducing an air (also referred to as secondary air) into an exhaust port 27 of an exhaust passage 4 (see FIG. 5) is mounted to an upper portion of the head cover 11. The air suction valve 12 suctions air in the first air-intake box 5 through a first communicating pipe 13 connected to the first air-intake box 5. The suctioned air is delivered from the air suction valve 12 into the exhaust passage 4 through a second communicating pipe 14 connected to the head cover 11 and a communicating passage 15 (see FIG. 5) formed in the head cover 11 to extend from the second communicating pipe 14 to the exhaust passage 4. Specifically, the suctioned air is delivered into the vicinity of the exhaust valve 27a in the exhaust port 27 of a cylinder head 10A of the engine. Thus, the secondary air to be delivered to the exhaust passage 4 is suctioned from the air-intake passage upstream of the throttle body 7. Therefore, the flow of the secondary air is not changed by the opening/closing of the throttle body 7.

The air suction valve 12 is provided with a pressure detecting pipe 16 for detecting an internal pressure of the air-intake passage located downstream of the throttle body 7. The pressure detecting pipe 16 is inserted into the second air-intake box 8 and adapted to detect the internal pressure of the second air-intake box 8. With such a constitution, the air suction valve 12 delivers the secondary air according to an opening degree of the throttle body 7 to the exhaust passage 4 (FIG. 5). Specifically, the smaller the opening degree of the throttle body 7 is, the smaller the opening degree of the air suction valve 12 is made, thereby lessening the flow of the secondary air. By doing so, required amount of the secondary air is properly supplied to the exhaust passage 4.

A tip-end suction port 13a of the first communicating pipe 13 is placed in the vicinity of an exhaust port 31 (inside the first air-intake box 5) of a breather pipe 30 located between an oil tank (not shown) and the first air-intake box 5. With such a configuration, the breather gases being discharged from the oil tank into the first air-intake box 5 are introduced into the exhaust passage 4 as much as possible and combusted.

Figure 6:
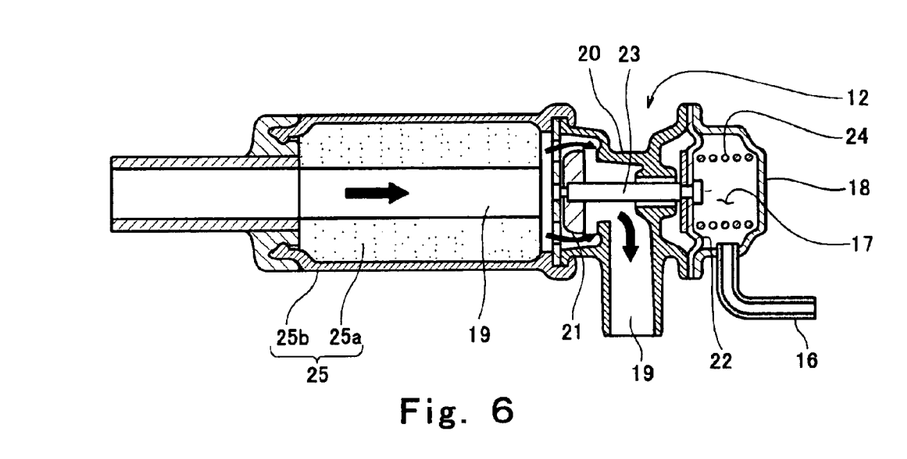
FIG. 6 is a cross-sectional view showing an example of a secondary air supplying device (with a valve being at an open position) of the engine in FIG. 2.
Figure 7:
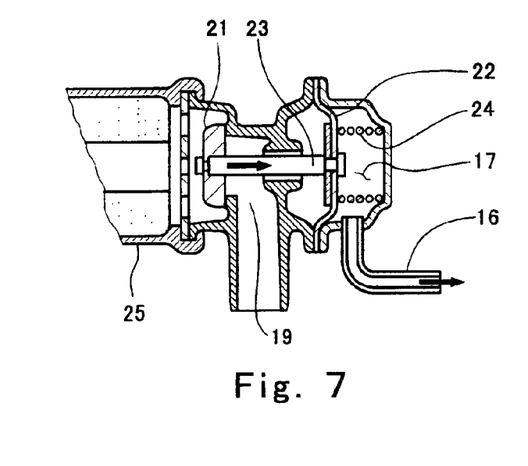
FIG. 7 is a cross-sectional view showing the state in which the valve of the secondary air supplying device in FIG. 6 is at a closed position.

FIGS. 6 and 7 show a structure of the air suction valve 12. In these Figures, arrows indicate the flow of the air. As shown in FIG. 6, the air suction valve 12 comprises a housing 18 that defines a pressure detecting chamber 17 communicating with the second air-intake box 8 through the pressure detecting pipe 16 and a valve body 20 having a secondary air passage 19. A valve disc 21 is mounted in the valve body 20 for opening/closing the secondary air passage 19. The pressure detecting chamber 17 is separated from the secondary air passage 19 by a diaphragm 22. The diaphragm 22 is connected to the valve disc 21 by means of a connecting rod 23. A coil spring 24 is mounted in the pressure detecting chamber 17 for biasing the valve disc 21 to open through the connecting rod 23. When the internal pressure of the pressure detecting chamber 17, i.e., the internal pressure of the second air-intake box 8 is reduced, the diaphragm 22 moves toward the housing 18 against a biasing force of the coil spring 24, and correspondingly, the valve disc 21 moves in a valve-closing direction. FIG. 7 shows the air suction valve 12 being at the closed position. Conversely, when the internal pressure of the second air-intake box 8 is increased, the diaphragm 22 moves toward the valve body 20 by the biasing force of the coil spring 24, and thereby, the valve disc 21 moves in a valve-opening direction (FIG. 6). With such a structure, when the opening degree of the throttle body 7 is reduced and the internal pressure of the second air-intake box 8 is reduced, the opening degree of the air suction valve 12 is reduced, thereby resulting in a reduced flow of the secondary air.

The valve body 20 is provided with a noise absorbing member 25 connected to the first communicating pipe 13 (see FIG. 2). The noise absorbing member 25 has the secondary air passage 19, and is constituted by a noise absorbing material 25a surrounding the secondary air passage 19 and a housing 25b containing the noise absorbing material 25a. The role of the noise absorbing material 25a is to absorb the noises generated in a secondary air supplying system. An outer surface of the noise absorbing material 25a, which is in contact with the secondary air, is covered by a waterproof resin sheet (not shown). This makes it possible to prevent reduction of a noise absorbing effect that would be otherwise caused by absorption of moisture contained in the secondary air by the noise absorbing material 25a.

In this embodiment, the air suction valve 12 is located as high as an upper end of the second air-intake box 8 and lower than the second air-intake pipe 9. Thus, the entire engine is constructed in a compact form. To this end, as shown in FIG. 3, the air-suction valve 12 and the communicating pipes 13, 14 are arranged between the second air-intake pipes 9 as seen in a plan view.

In this embodiment, the first air-intake box 5 on the upstream side of the air-intake passage is located lower than the waterline of the watercraft and the second air-intake box 8 on downstream side of the air-intake passage is located higher than the waterline. Alternatively, the first air-intake box 5 may be located higher and the second air-intake box 8 is located lower than the waterline. The arrangement of these air-intake boxes 5, 8 is determined depending on the arrangement of the engine 1 in the engine room. Also, in this case, the air-intake hole 5a of the first air-intake box 5 is formed in the vicinity of the bottom of the first air-intake box 5 and the air-intake pipes 6, 9 are connected to the upper portions of the air-intake boxes 5, 8.

In the above embodiment, the straddle-type personal watercraft, in particular, the watercraft in which the engine is contained below the seat, has been described. However, the present invention is not intended to be limited to this structure, but is applicable to any other personal watercraft, including personal watercraft comprising an engine contained in a body located forward of a seat, the stand-up type personal watercraft, etc.

Although the present invention has been described by way of example with reference to the accompanying drawings, it is to be understood that various changes and modifications will be apparent to those skilled in the art. Therefore, unless otherwise such changes and modifications depart from the scope of the invention, they should be construed as being included therein.

What is claimed is:

1. A personal watercraft having a water jet pump configured to propel the watercraft, the personal watercraft comprising:

an engine for driving the water jet pump, the engine having an air-intake port provided within a cylinder head of the engine;

an air-intake passage including first and second air-intake boxes and first and second air-intake pipes, the first air-intake box being connected to the second air-intake box by the first air-intake pipe, and the second air-intake box being connected to the air-intake port of the engine by the second air-intake pipe; and a throttle valve provided in the first air-intake pipe;

wherein the first air-intake box is located on one of right and left sides of the engine, and the second air-intake box is located on the other side of the right and left sides of the engine such that the first air-intake box is located upstream of the second air-intake box in an air flow along the air-intake passage to the engine;

wherein the first air intake box has an air inlet and an air outlet, and the second air intake box has an air inlet and an air outlet;

wherein the first air-intake pipe is configured to connect the air outlet of the first air-intake box to the air inlet of the second air-intake box, and the second air-intake pipe is configured to connect the air outlet of the second air-intake box to the engine; and wherein the air suctioned from the first air-intake box is drawn to the engine through the second air intake box.

2. The personal watercraft according to claim 1, wherein the first air-intake box has an air outlet to which the first air-intake pipe is connected, and the second air-intake box has an air outlet to which the second air-intake pipe is connected, and the air outlet of the first air-intake box and the air outlet of the second air-intake box are located at different positions in a vertical direction.

3. The personal watercraft according to claim 2, wherein the air outlet of the first air-intake box is located higher than a bottom portion of the first air-intake box, and the air outlet of the second air-intake box is located higher than a bottom portion of the second air-intake box.

4. A personal watercraft having a water jet pump configured to propel the watercraft, the personal watercraft comprising:

an engine for driving the water jet pump, the engine having an air-intake port provided within a cylinder head of the engine;

an air-intake passage including first and second air-intake boxes and first and second air-intake pipes, the first air-intake box being connected to the second air-intake box by the first air-intake pipe, and the second air-intake box being connected to the air-intake port of the engine by the second air-intake pipe; and a throttle valve provided in the first air-intake pipe;

wherein the first air-intake box is located on one of right and left sides of the engine, and the second air-intake box is located on the other side of the right and left sides of the engine such that the first air-intake box is located upstream of the second air-intake box in an air flow along the air-intake passage to the engine wherein the first air-intake box has an air outlet to which the first air-intake pipe is connected, and the second air-intake box has an air outlet to which the second air-intake pine is connected;

wherein the air outlet of the first air-intake box and the air outlet of the second air-intake box are located at different positions in a vertical direction; and wherein one of the air outlets of the first and second air-intake boxes is located higher than a waterline of the watercraft when the watercraft is at rest on water, and the other air outlet is positioned to inhibit water flow therethrough when the watercraft is inverted in water.

5. A personal watercraft having a water jet pump configured to propel the watercraft, the personal watercraft comprising:

an engine for driving the water jet pump, the engine having an air-intake port provided within a cylinder head of the engine;

an air-intake passage including first and second air-intake boxes and first and second air-intake pipes, the first air-intake box being connected to the second air-intake box by the first air-intake pine, and the second air-intake box being connected to the air-intake port of the engine by the second air-intake pipe;

a throttle valve provided in the first air-intake pipe; and a secondary air supplying device adapted to suction air from the air-intake passage, the secondary air supplying device having an air suction valve therein, wherein the first air-intake box is located on one of right and left sides of the engine, and the second air-intake box is located on the other side of the right and left sides of the engine such that the first air-intake box is located upstream of the second air-intake box in an air flow along the air-intake passage to the engine; and wherein the secondary air supplying device is adapted to suction air from a portion of the air-intake passage and to deliver the air as secondary air to an exhaust port of the engine, the portion of the air-intake passage being located upstream of the throttle valve.

6. The personal watercraft according to claim 5, wherein the engine further includes a head cover provided over the cylinder head, and wherein the secondary air supplying device is located higher than the head cover of the engine and lower than an upper face of one of the first and second air-intake boxes which is located higher than the other.

7. The personal watercraft according to claim 5, wherein the secondary air supplying device has a detecting portion for detecting an internal pressure of a portion of the air-intake passage, the portion of the air-intake passage being located downstream of the throttle valve, and is adapted to adjust an amount of secondary air delivered into the exhaust port according to the pressure detected by the detecting portion.

8. The personal watercraft according to claim 7, wherein the secondary air-supplying device has a first communicating pipe configured to suction air, a second communicating pipe configured to deliver the secondary air to the exhaust port of the engine, and a pressure-detecting pipe configured to obtain a pressure from the air-intake passage to drive the air suction valve of the secondary air-supplying device; and wherein the first communicating pipe is connected to the first air-intake box, the second communicating pipe is connected to the exhaust port, and the pressure-detecting pipe is connected to the second air-intake box.

9. The personal watercraft according to claim 5, wherein the secondary air supplying device contains a noise absorbing member provided with an air passage through which suctioned air flows.

10. The personal watercraft according to claim 9, wherein at least a face of the noise absorbing member which is in contact with secondary air is covered by a water-proof material.

11. The personal watercraft according to claim 9, wherein the noise-absorbing member is comprised of a pipe-shaped member provided with the air passage within which the secondary air flows, and is located adjacent the air suction valve on an upstream side of the air suction valve of the secondary air-supplying device.

12. A personal watercraft having a water jet pump configured to propel the watercraft, the personal watercraft comprising:

an engine for driving the water jet pump, the engine having an air-intake port provided within a cylinder head of the engine;

an air-intake passage including first and second air-intake boxes and first and second air-intake pipes, the first air-intake box being connected to the second air-intake box by the first air-intake pipe, and the second air-intake box being connected to the air-intake port of the engine by the second air-intake pipe; and a throttle valve provided in the first air-intake pipe;

wherein the first air-intake box is located on one of right and left sides of the engine, and the second air-intake box is located on the other side of the right and left sides of the engine such that the first air-intake box is located upstream of the second air-intake box in an air flow along the air-intake passage to the engine wherein the first air-intake box has an air outlet to which the first air-intake pipe is connected, and the second air-intake box has an air outlet to which the second air-intake pipe is connected;

wherein the air outlet of the first air-intake box and the air outlet of the second air-intake box are located at different positions in a vertical direction; and wherein the engine further includes a head cover provided over the cylinder head, and wherein the first air-intake box is placed on the air-intake port side of the engine, and the second air-intake box is placed on an opposite side of the air-intake port side of the engine;

the air outlet of the second air-intake box is located higher than the air outlet of the first air-intake box, and the second air-intake pipe traverses from the second air-intake box over the head cover and, is connected to the air-intake port, of the engine.

* * * * *